(12) United States Patent
Hasegawa

(10) Patent No.: US 9,010,844 B2
(45) Date of Patent: Apr. 21, 2015

(54) VEHICLE BODY FRONT STRUCTURE

(75) Inventor: Masami Hasegawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 219 days.

(21) Appl. No.: 13/584,018

(22) Filed: Aug. 13, 2012

(65) Prior Publication Data

US 2013/0048404 A1    Feb. 28, 2013

(30) Foreign Application Priority Data

Aug. 24, 2011   (JP) ................................ 2011-182724

(51) Int. Cl.
*B60R 21/34* (2011.01)
*B62D 25/08* (2006.01)
*B60R 19/52* (2006.01)

(52) U.S. Cl.
CPC .............. *B62D 25/082* (2013.01); *B60R 21/34* (2013.01); *B60R 2019/525* (2013.01); *B60R 2021/343* (2013.01)

(58) Field of Classification Search
CPC ...... B60R 21/34; B62D 25/08; B62D 25/084; B62D 25/085; B62D 25/10; B62D 25/105
USPC ................. 180/68.1, 68.4, 68.6; 296/187.09, 296/187.03, 187.04, 193.1, 193.11
See application file for complete search history.

(56) References Cited

U.S. PATENT DOCUMENTS

| | | | | |
|---|---|---|---|---|
| 5,478,127 A | * | 12/1995 | Chase | 293/115 |
| 6,676,179 B2 | * | 1/2004 | Sato et al. | 293/115 |
| 6,688,424 B1 | * | 2/2004 | Nakada et al. | 181/224 |
| 7,044,246 B2 | * | 5/2006 | Fujieda | 180/68.4 |
| 7,108,092 B2 | * | 9/2006 | Suwa et al. | 180/68.4 |
| 7,438,348 B2 | * | 10/2008 | Nakamae et al. | 293/115 |
| 7,455,351 B2 | * | 11/2008 | Nakayama et al. | 296/193.1 |
| 7,651,156 B2 | * | 1/2010 | Park | 296/187.04 |
| 8,491,038 B2 | * | 7/2013 | Challal et al. | 296/187.09 |
| 2002/0096378 A1 | * | 7/2002 | Kobayashi | 180/68.6 |
| 2008/0277951 A1 | * | 11/2008 | Rathje et al. | 293/115 |
| 2009/0026798 A1 | * | 1/2009 | Lee | 296/187.04 |
| 2012/0228048 A1 | * | 9/2012 | Ralston et al. | 180/274 |

FOREIGN PATENT DOCUMENTS

| | | | | |
|---|---|---|---|---|
| JP | 56031846 A | * | 3/1981 | ............. B60R 19/00 |
| JP | 2008-296851 | | 12/2008 | |

* cited by examiner

*Primary Examiner* — Glenn Dayoan
*Assistant Examiner* — Paul Chenevert
(74) *Attorney, Agent, or Firm* — Smith, Gambrell & Russell, LLP

(57) ABSTRACT

A vehicle body front structure is provided. In the vehicle body front structure, a front grille and a bumper extend in the up-and-down direction in a front end portion of the vehicle body, the bumper bends and extends rearwardly from the front grille, a front end edge of a front hood is positioned adjacent to a top end portion of the extending bumper, a frame upper portion that supports a radiator extends in the body width direction and is supported on the back side of a front end portion of the front hood, and a box-like hollow impact absorber, which is made of sheet metal and extends in the body width direction, is provided in a space surrounded by the front grille, the bumper, the front end portion of the front hood, and the frame upper portion, and is supported by the frame upper portion via a plurality of legs.

3 Claims, 4 Drawing Sheets

VEHICLE BODY FRONT STRUCTURE

CROSS-REFERENCE TO RELATED APPLICATION

The present application claims priority from Japanese Patent Application No. 2011-182724 filed on Aug. 24, 2011, the entire contents of which are hereby incorporated by reference.

BACKGROUND OF THE INVENTION

1. Field of the Invention

The present invention relates to a vehicle body front structure for protecting the legs and the head of a pedestrian when a frontal collision occurs.

2. Description of the Related Art

Regarding a vehicle in which a front end edge of a front hood is positioned adjacent to a top end portion of a front grille provided in a front end portion of the vehicle body and extending in the up-and-down direction, a technique for lessening an impact when the vehicle collides with a pedestrian head-on by allowing the front hood to bend and deform upon coming into contact with the head of the pedestrian has been developed as described in Japanese Unexamined Patent Application Publication (JP-A) No. 2008-296851 for example.

There is also a vehicle in which a front grille extending in the up-and-down direction is provided in a front end portion of the vehicle body, a bumper extends upwardly from a top end portion of the front grille and then extends toward the rear side of the vehicle body, and a front end edge of a front hood is positioned adjacent to an end portion of the extending bumper. The end portion of the bumper, which extends toward the front hood, is fixed to a beam that extends in the body width direction and is supported by the vehicle body.

In the vehicle in which the front end edge of the front hood is disposed rearward relative to the front end of the vehicle, the distance between the front end portion of the vehicle and the front end edge of the front hood is longer than the corresponding distance in the vehicle described in JP-A No. 2008-296851. Therefore, when the vehicle collides with a pedestrian, the head of the pedestrian may hit the bumper end portion positioned forward relative to the front hood and the resistive force that the head receives may be excessively large. Besides, since the front grille is supported by the beam via the bumper, when a thigh of the pedestrian collides with the front grille, the resistive force that the thigh receives may also be excessively large because of poor performance of the front grille and the bumper in terms of impact absorption.

SUMMARY OF THE INVENTION

The present invention has been made in view of the above-described problems and is aimed at providing a vehicle body front structure that absorbs the impact energy caused when a thigh or the head of a pedestrian collides with a vehicle in which the front end edge of a front hood is positioned rearward relative to the front end of the vehicle.

To achieve this aim, in a vehicle body front structure according to an aspect of the present invention, one of top end portions of a front grille and a bumper, which extend in an up-and-down direction and are provided in a front end portion of the vehicle body, extends toward the rear side of the vehicle body, a front end edge of a front hood is positioned adjacent to the extending top end portion, a rigid member or a frame upper portion in an embodiment, which supports a radiator (not depicted), extends in the body width direction and is supported on the back side of a front end portion of the front hood, and an impact absorber that is hollow, made of sheet metal, and formed like a box extends in the body width direction and is supported in a space surrounded by inside surfaces of the front grille, the bumper, and the front end portion of the front hood, and a surface of the rigid member.

Also, according to the aspect of the present invention, the impact absorber is supported by the rigid member via a plurality of legs provided in the body width direction at predetermined intervals, top end portions of the legs are connected to a bottom surface portion of the impact absorber, bottom end portions of the legs are connected to the rigid member, and gaps that allow air entering from the front of the vehicle body into the vehicle body to flow toward the rear side of the vehicle body are formed among the legs.

In addition, according to the aspect of the present invention, each of the legs includes a reception surface that is formed on the leg and connected to the rear side of the bottom surface portion of the impact absorber, the reception surface includes a stepped portion that bends downwardly in a front end portion of the reception surface, and when an impact load directed toward the rear side of the vehicle body acts on the impact absorber, the impact absorber rotates downwardly to the front side of the stepped portion and squashes the leg.

Furthermore, according to the aspect of the present invention, the front grille and the bumper are attached to a surface of the impact absorber.

DESCRIPTION OF THE PREFERRED EMBODIMENTS

Figure 1:
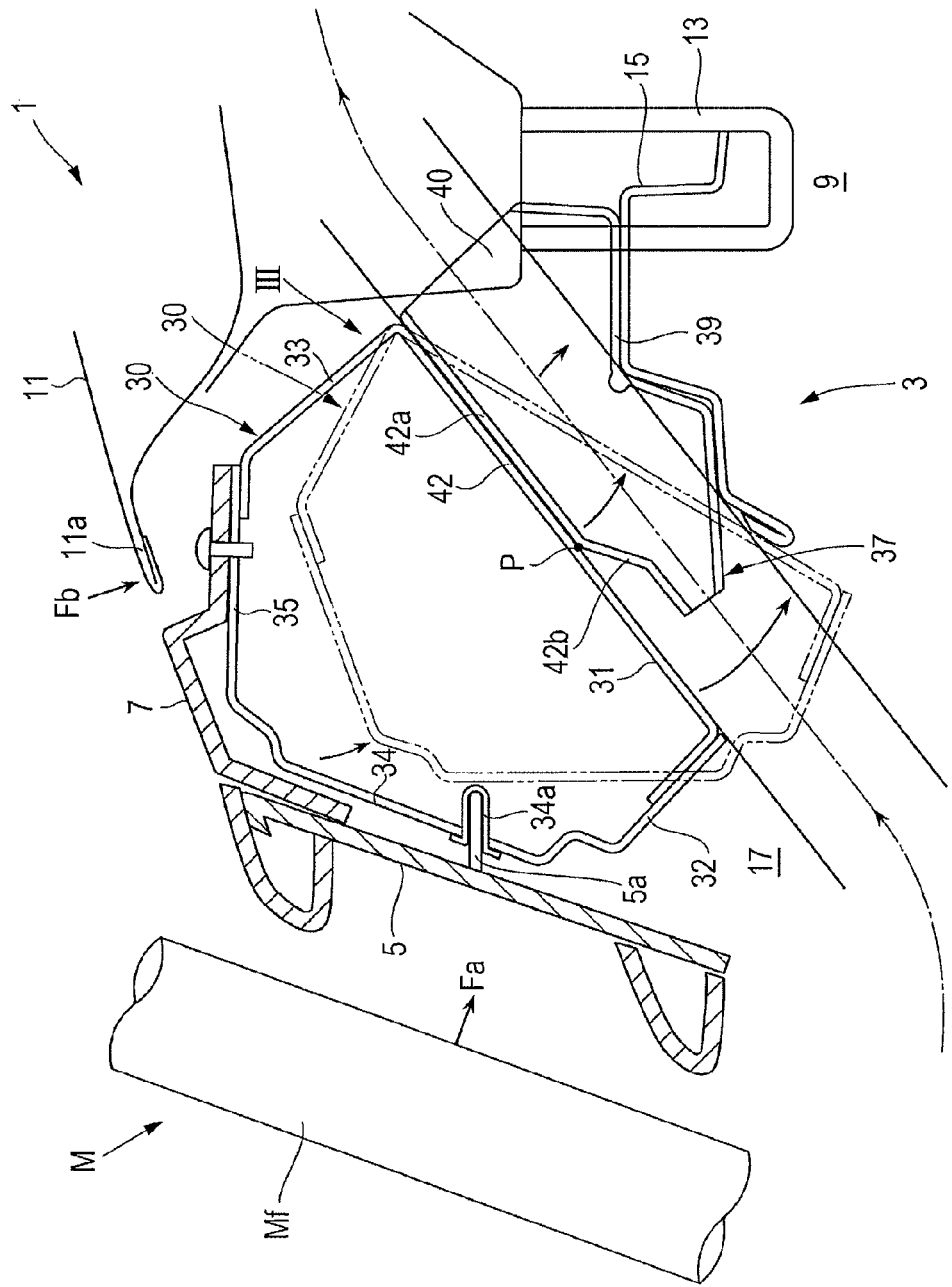
FIG. 1 is a sectional view of the main part of a vehicle body front structure according to an embodiment of the present invention.
Figure 2:
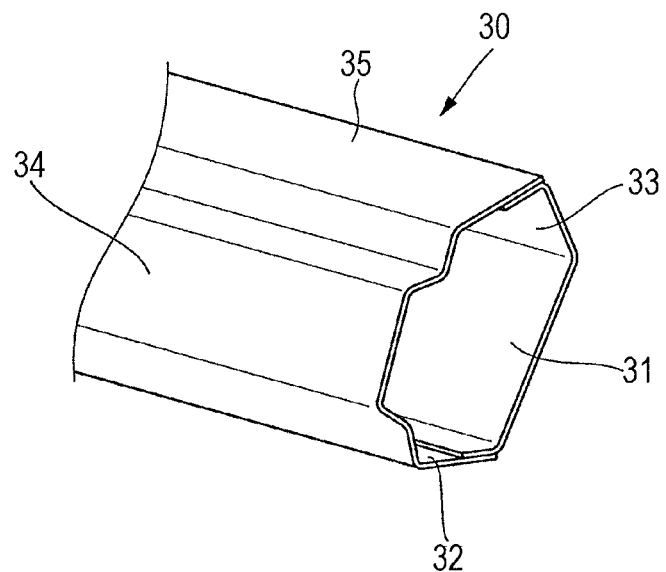
FIG. 2 is a partial perspective view of a box-like impact absorber according to the embodiment of the present invention.
Figure 3:
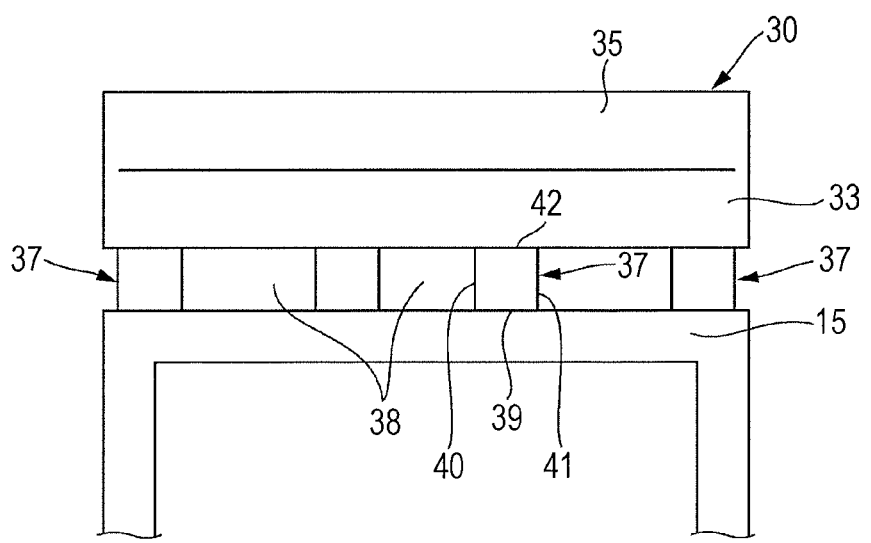
FIG. 3 is a schematic back view of the vehicle body front structure, which is equivalent to the view from arrow III in FIG. 1.

Preferred embodiments of a vehicle body front structure according to the present invention are described below with reference to FIGS. 1 to 5. Each of the embodiments takes an ordinary automobile from among vehicles as an example and particularly describes an ordinary automobile in which a front end edge of a front hood is disposed rearward relative to the front end of the vehicle.

A front end portion of a body 3 of a vehicle 1 is provided with a front grille 5 extending in the up-and-down direction, and a top end portion of the front grille 5 is provided with a bumper 7 extending upwardly on the rear side of the front grille 5 to bend toward the rear side of the body 3 and extend rearwardly. The front grille 5 and the bumper 7 are partially attached to a below-described impact absorber 30 provided inside of the front grille 5 and the bumper 7. A front end edge 11a of a front hood 11 that covers an upper portion of an engine compartment 9 is disposed adjacent to the top end portion of the bumper 7 extending toward the rear side of the body 3. That is, the front end edge 11a of the front hood 11 is positioned rearward relative to the front end of the vehicle 1.

A lock striker 13 projecting downwardly is provided under a front end portion of the front hood 11. The lock striker 13 is formed so as to be lockable by a frame upper portion 15 that extends in a direction that crosses the lock striker 13 and supports a radiator. The frame upper portion 15 extends in the body width direction and is formed like a cap that projects upwardly when seen from the side. A front side end portion of the frame upper portion 15 bends and extends forwardly. That is, the frame upper portion 15 is formed like stairs when seen from the side.

The above-mentioned impact absorber 30 is provided in a space 17 surrounded by the front grille 5, the bumper 7, the front end edge 11a of the front hood 11, and the frame upper portion 15. The impact absorber 30 is described with reference to FIGS. 1 to 3. The impact absorber 30 is made of sheet metal, extends in the body width direction, and is formed like a hollow box. The impact absorber 30 is shaped like a polygon when seen from the side and includes a bottom surface portion 31 inclined diagonally downwardly, a front side surface portion 32 extending upwardly from a front end portion of the bottom surface portion 31, a rear side surface portion 33 extending upwardly from a rear end portion of the bottom surface portion 31, a front surface portion 34 extending upwardly from the front side surface portion 32, and a top surface portion 35 extending forwardly from the rear side surface portion 33 and leading to the front surface portion 34.

A plurality of legs 37 provided in the body width direction at predetermined intervals are attached to the bottom surface portion 31 and connected to the frame upper portion 15 via a fastening unit such as bolts. The impact absorber 30 and the legs 37 are supported by the frame upper portion 15. Gaps 38 that allow air entering from the front of the body 3 into the body 3 to flow toward the rear side of the body 3 are formed among the legs 37. Each of the legs 37 is made of sheet metal and formed like a hollow tube. The leg 37 is shaped like a polygon when seen from the side and includes a stair-like bottom surface 39 directed downwardly and extending along the frame upper portion 15, a pair of side surfaces 40 and 41 extending upwardly from both side end portions of the bottom surface 39, and a reception surface 42 leading to top end portions of the side surfaces 40 and 41.

The reception surface 42 is formed so as to include a planar surface portion 42a that contacts the bottom surface portion 31 of the impact absorber 30, and a stepped portion 42b that bends at a front end portion of the planar surface portion 42a and extends downwardly to bend again forwardly and extend toward the front. The planar surface portion 42a has a length of approximately half the length of the bottom surface portion 31 of the impact absorber 30, which is obtained in the front-and-back direction, and is connected to the rear side of the bottom surface portion 31 via a fastening unit such as a bolt.

The stepped portion 42b is positioned approximately in the middle in the length direction of the bottom surface portion 31 of the impact absorber 30, which is obtained in the front-and-back direction. Therefore, when impact loads Fa and Fb directed toward the rear side of the body 3 act on the impact absorber 30, the impact absorber 30 rotates downwardly to the front side of the stepped portion 42b and squashes the front side of the leg 37. The impact load Fa is a load that acts from a thigh Mf of a pedestrian M when the vehicle 1 collides with the pedestrian M, and the impact load Fb is a load that acts from the head of the pedestrian M when the vehicle 1 collides with the pedestrian M.

The front surface portion 34 of the impact absorber 30 is provided with an attachment depressed portion 34a extending in the front-and-back direction. A latching projecting portion 5a of the front grille 5 is inserted into the attachment depressed portion 34a so that the front grille 5 is attached to the front surface portion 34. A rear portion of the bumper 7 is attached to the top surface portion 35 of the impact absorber 30 via a fastening unit such as a bolt. Thus, the front grille 5 and the bumper 7 are formed integrally with the impact absorber 30.

Next, how the vehicle body front structure functions when the vehicle 1 collides with the pedestrian M head-on is described with reference to FIG. 1. As described above, the vehicle body front structure of the present invention is based on the premise that the front end edge 11a of the front hood 11 is positioned rearward relative to the front end of the vehicle 1. Therefore, when the vehicle 1 collides with the pedestrian M head-on, the thigh Mf of the pedestrian M collides with the front grille 5 and the head of the pedestrian M hits the periphery of the front end edge 11a of the front hood 11.

When the thigh Mf of the pedestrian M collides with the front grille 5 and the head of the pedestrian M hits the periphery of the front end edge 11a of the front hood 11, the impact absorber 30 tries to rotate downwardly to the front side of the stepped portion 42b about a point P at which the impact absorber 30 contacts the stepped portion 42b of the leg 37 because the impact loads Fa and Fb caused at this time have downward directional components. Accordingly, when the impact absorber 30 rotates, the front side of the leg 37 is squashed onto the frame upper portion 15 and the rear side of the leg 37 is squashed via the bottom surface portion 31 of the impact absorber 30. As a result, the impact absorber 30 itself is squashed. That is, the crushing behavior of the legs 37 and the impact absorber 30 involves two stages: the rotation and the squashing of the impact absorber 30. In addition, since the front grille 5 and the bumper 7 are integrally attached to the impact absorber 30, even the front grille 5 and the bumper 7 may absorb the impact energy by deforming with the legs 37 and the impact absorber 30 when the legs 37 and the impact absorber 30 are squashed. Thus, excessive resistive force that acts on the pedestrian M may be suppressed and the protection of the thighs Mf and the head of the pedestrian M at the time of collision may be improved.

Furthermore, since the impact absorber 30 is formed like a box, the impact absorber 30 may receive the impact loads Fa and Fb via a surface and transmit the deformation of the impact absorber 30 in the body width direction. Thus, the absorption of the impact energy may be improved.

Figure 4:
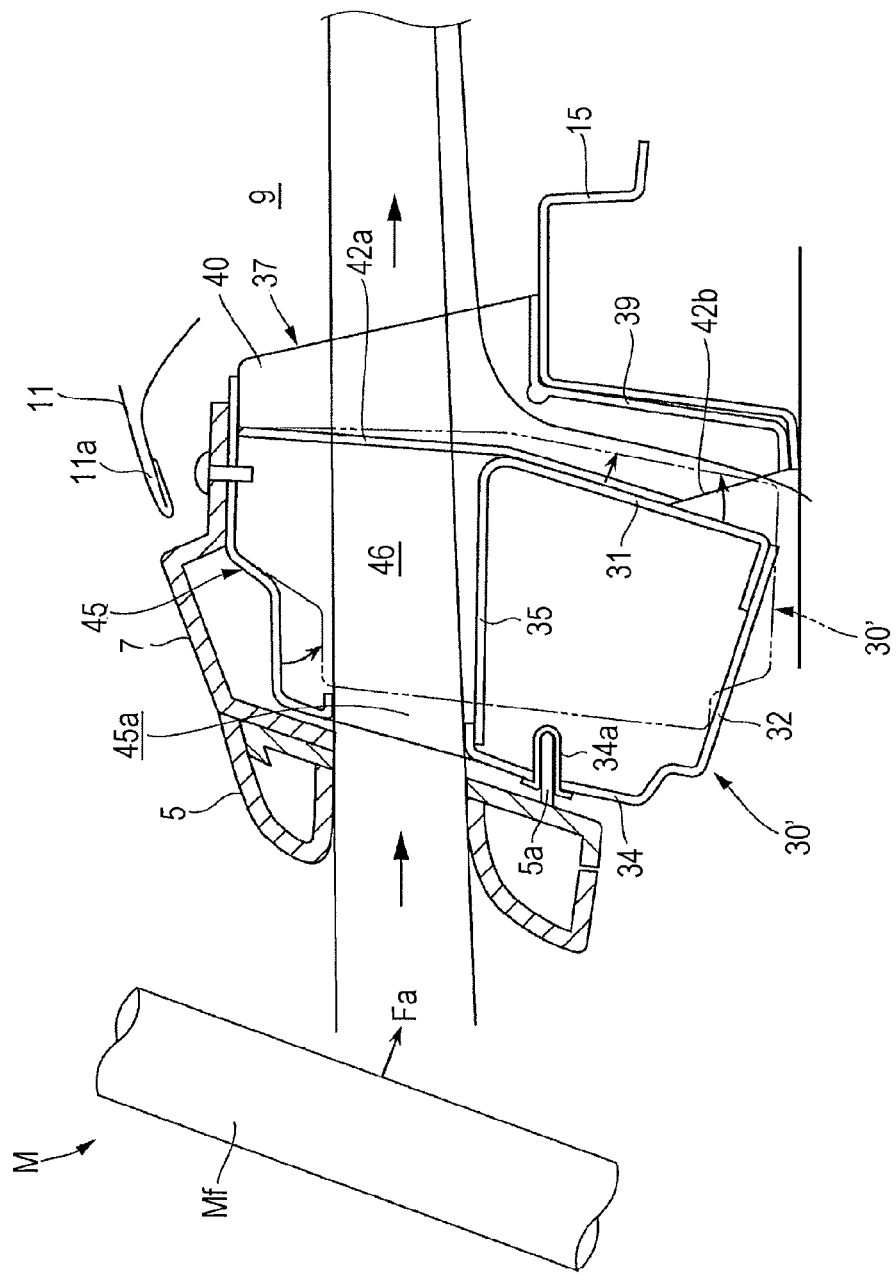
FIG. 4 is a sectional view of the main part of a vehicle body front structure according to another embodiment of the present invention.
Figure 5:
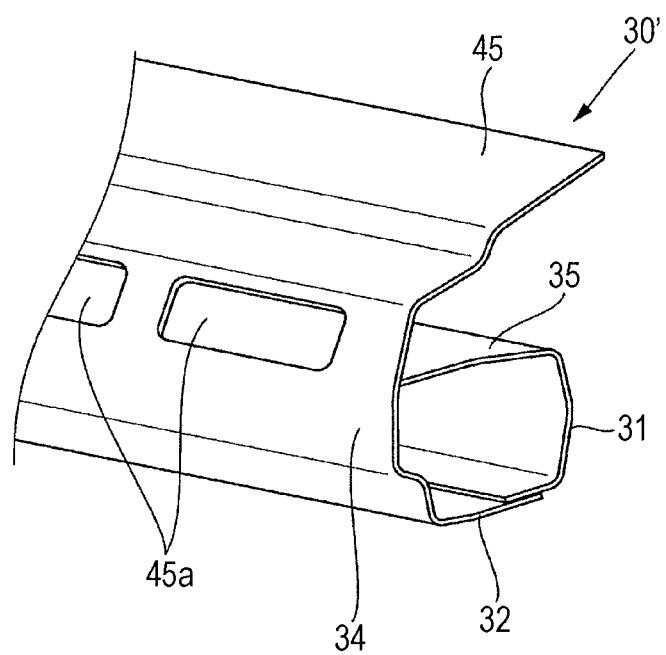
FIG. 5 is a partial perspective view of a box-like impact absorber according to the other embodiment of the present invention.

In the above-described embodiment, the impact absorber 30 has a height approximately the same as the height of the front grille 5. However, as illustrated in FIGS. 4 and 5, an impact absorber 30' in which a top surface portion 35 is positioned at a level approximately the same as the level of the lower portion of a front grille 5 may be used instead. In the description of the impact absorber 30', the same reference numerals are used to denote the elements that function similarly to those of the impact absorber 30 and the explanation of such elements is omitted.

In the impact absorber 30', a front surface portion 34 extends so as to be higher than the top surface portion 35, and bends rearwardly and extends toward the rear side of the vehicle body. Hereinafter, the extending surface portion is referred to as a head reception surface portion 45. That is, the head reception surface portion 45 has a cantilevered support structure in which the front side is supported and the rear side is flexible. Due to the structure, the head reception surface portion 45 may bend downwardly and deform to absorb the impact energy when the head of a pedestrian M collides with the periphery of a front end edge 11a of a front hood 11. Moreover, since the major part of the impact absorber 30' is positioned under the head reception surface portion 45 having a cantilevered support structure via a space 46, the deformation amount of the head reception surface portion 45 may be increased and the excessive resistive force may be suppressed.

Under the head reception surface portion 45, a plurality of flow openings 45a for allowing air to flow are provided in the body width direction at predetermined intervals. Accordingly, the introduction of air into an engine compartment 9 may become easier. Similar to the foregoing embodiment, the impact absorber 30' is supported by a frame upper portion 15 via a plurality of legs 37 connected to a bottom surface portion 31.

What is claimed is:

1. A vehicle body front structure comprising:
    a front grille and a bumper that extend in an up-and-down direction and are provided in a front end portion of a vehicle body, a top end portion of either the front grille or the bumper extending toward a rear side of the vehicle body;
    a front hood, a front end edge of the front hood being positioned adjacent to the extending top end portion of either the front grille or the bumper;
    a rigid member that supports a radiator, extends in a body width direction, and is supported on a back side of a front end portion of the front hood;
    an impact absorber that extends in the body width direction and is supported in a space surrounded by inside surfaces of the front grille, the bumper, and the front end portion of the front hood, and a surface of the rigid member, the impact absorber being hollow, made of sheet metal, and formed like a box; and
    a plurality of legs, wherein:
    the plurality of legs are provided in the body width direction at predetermined intervals, top end portions of the plurality of legs being connected to a bottom surface portion of the impact absorber, bottom end portions of the plurality of legs being connected to the rigid member;
    the impact absorber is supported by the rigid member via the plurality of legs;
    gaps that allow air entering from a front of the vehicle body into the vehicle body to flow toward the rear side of the vehicle body are formed among the plurality of legs; and
    the front grille and the bumper are attached to a surface of the impact absorber.

2. The vehicle body front structure according to claim 1, wherein:
    each of the plurality of legs includes a reception surface that is formed on the leg and connected to a rear side of the bottom surface portion of the impact absorber;
    the reception surface includes a stepped portion that bends downwardly in a front end portion of the reception surface; and
    the impact absorber being configured such that, when an impact load directed toward the rear side of the vehicle body acts on the impact absorber, the impact absorber rotates downwardly to a front side of the stepped portion and squashes the leg.

3. A vehicle body front structure comprising:
    a front grille and a bumper that extend in an up-and-down direction and are provided in a front end portion of a vehicle body, a top end portion of either the front grille or the bumper extending toward a rear side of the vehicle body;
    a front hood, a front end edge of the front hood being positioned adjacent to the extending top end portion of either the front grille or the bumper;
    a rigid member that supports a radiator, extends in a body width direction, and is supported on a back side of a front end portion of the front hood;
    an impact absorber that extends in the body width direction and is supported in a space surrounded by inside surfaces of the front grille, the bumper, and the front end portion of the front hood, and a surface of the rigid member, the impact absorber being hollow, made of sheet metal, and formed like a box; and
    a plurality of legs, wherein:
    the plurality of legs are provided in the body width direction at predetermined intervals, top end portions of the plurality of legs being connected to a bottom surface portion of the impact absorber, bottom end portions of the plurality of legs being connected to the rigid member;
    the plurality of legs are formed as hollow tubes,
    the plurality of legs includes a reception surface connected to a rear side of the bottom surface portion of the impact absorber, a stair-like bottom surface directed downwardly and extending along the rigid member, and a pair of side surfaces extending upwardly from both side end portions of the bottom surface;
    the impact absorber is supported by the rigid member via the plurality of legs;
    gaps that allow air entering from a front of the vehicle body into the vehicle body to flow toward the rear side of the vehicle body are formed among the plurality of legs.

* * * * *